(12) United States Patent
Elrod

(10) Patent No.: US 8,740,196 B2
(45) Date of Patent: Jun. 3, 2014

(54) DRAWBAR SPRING COUPLER

(76) Inventor: Jay Rodger Elrod, Bloomington, MN (US)

( * ) Notice: Subject to any disclaimer, the term of this patent is extended or adjusted under 35 U.S.C. 154(b) by 367 days.

(21) Appl. No.: 13/051,163

(22) Filed: Mar. 18, 2011

(65) Prior Publication Data

US 2012/0235382 A1 Sep. 20, 2012

(51) Int. Cl.
*F16F 1/26* (2006.01)
*F16F 1/46* (2006.01)
*B60G 11/10* (2006.01)

(52) U.S. Cl.
USPC ............... 267/72; 267/73; 267/74; 267/89; 267/151; 267/166; 267/178; 267/179; 267/289; 267/291; 59/78; 59/82; 59/83; 59/93; 160/189; 160/201; 160/209; 280/483

(58) Field of Classification Search
USPC ............ 267/291, 179, 260, 166, 289, 169; 267/14–149, 166.1, 167, 170, 174, 267/177–178, 180, 182, 250, 286–288; 59/93, 3, 79.2–79.3, 82; 280/483; 16/5–6; 188/2 D; 248/149, 526, 570, 248/628, 562; 403/60, 89, 109.3
See application file for complete search history.

(56) References Cited

U.S. PATENT DOCUMENTS

| | | | | | |
|---|---|---|---|---|---|
| 290,688 | A | * | 12/1883 | Johnson | 59/83 |
| 577,801 | A | * | 2/1897 | Welch | 213/166 |
| 1,494,849 | A | * | 5/1924 | Lister | 152/2 |
| 1,846,257 | A | | 2/1932 | Huck | |
| 2,454,932 | A | * | 11/1948 | La Valliere | 248/576 |
| 2,991,064 | A | | 7/1961 | De Jean | |
| 3,653,652 | A | * | 4/1972 | Lindberg, Jr. | 267/71 |
| 4,351,523 | A | * | 9/1982 | Alexander | 482/123 |
| 5,139,243 | A | | 8/1992 | Balsells | |
| 5,615,870 | A | | 4/1997 | Balsells | |
| 5,647,137 | A | * | 7/1997 | McMurtry et al. | 33/572 |
| 2009/0265972 | A1 | * | 10/2009 | Chang | 40/771 |

* cited by examiner

*Primary Examiner* — Robert A Siconolfi
*Assistant Examiner* — San Aung
(74) *Attorney, Agent, or Firm* — Shumaker & Sieffert, P.A.

(57) ABSTRACT

A linkage comprises a first rounded end providing a complimentary profile configured to mate with an inner radius of a loop element in a first drawbar spring, and a second rounded end opposite the first rounded end. The second rounded end provides a complimentary profile configured to mate with an inner radius of a loop element in a second drawbar spring. The linkage is configured to be positioned between the loop element in the first drawbar spring and the loop element in the second drawbar spring such that the first rounded end is mated with the loop element in the first drawbar spring and the second rounded end is mated with the loop element in the second drawbar spring to mechanically couple the first drawbar spring in series with the second drawbar spring.

20 Claims, 7 Drawing Sheets

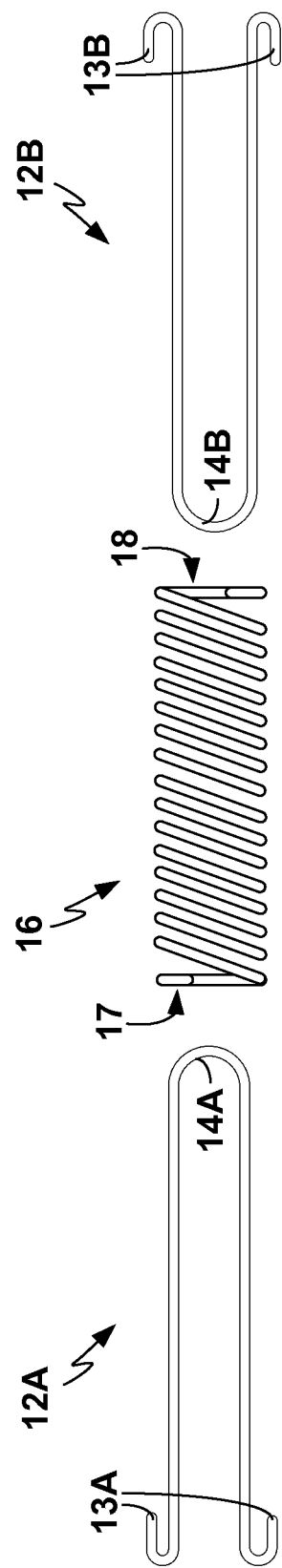
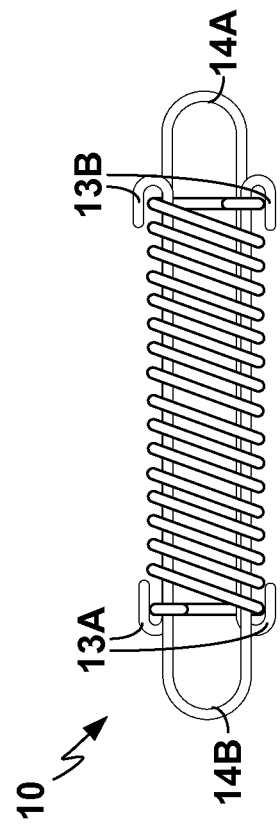
FIG. 1A
FIG. 1B

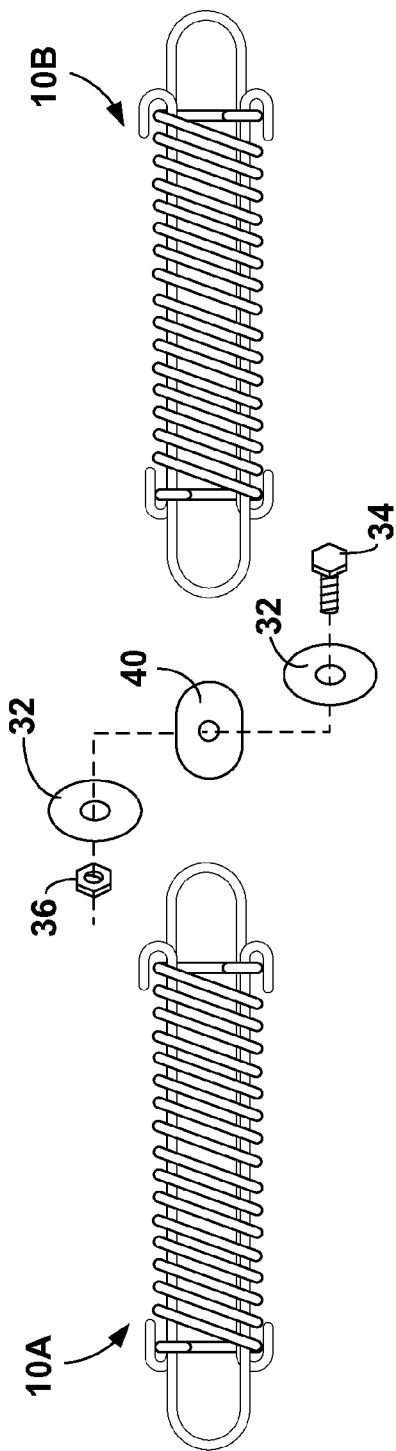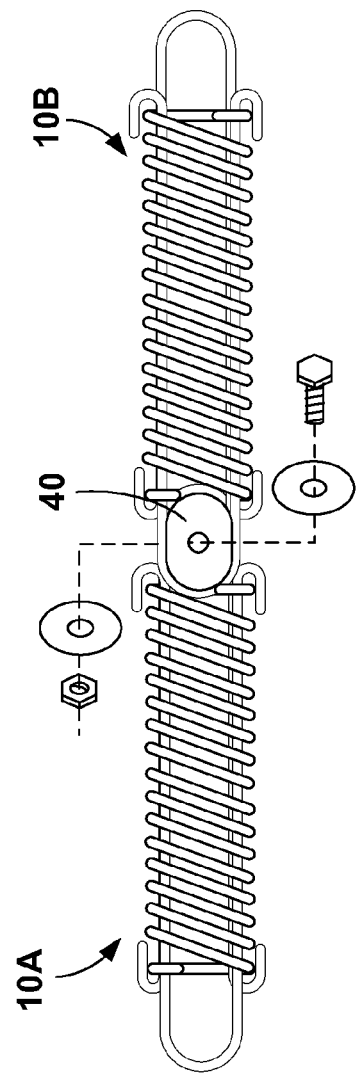

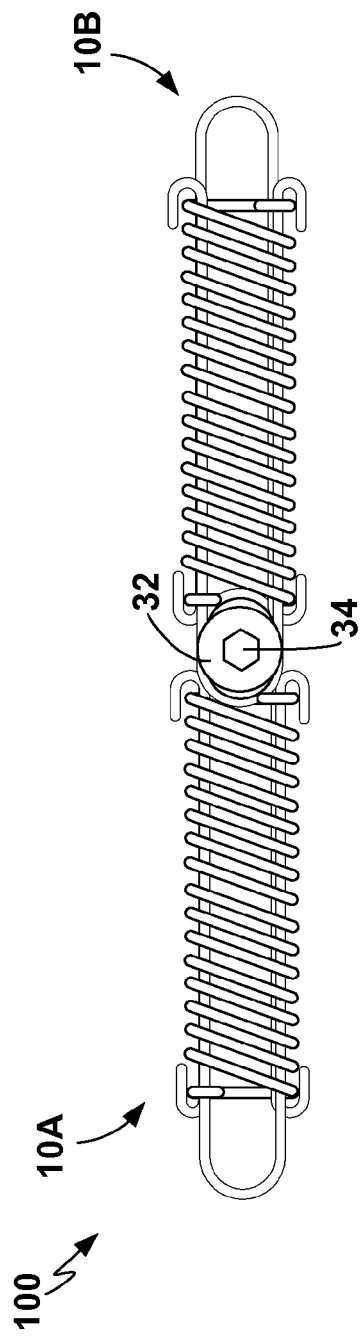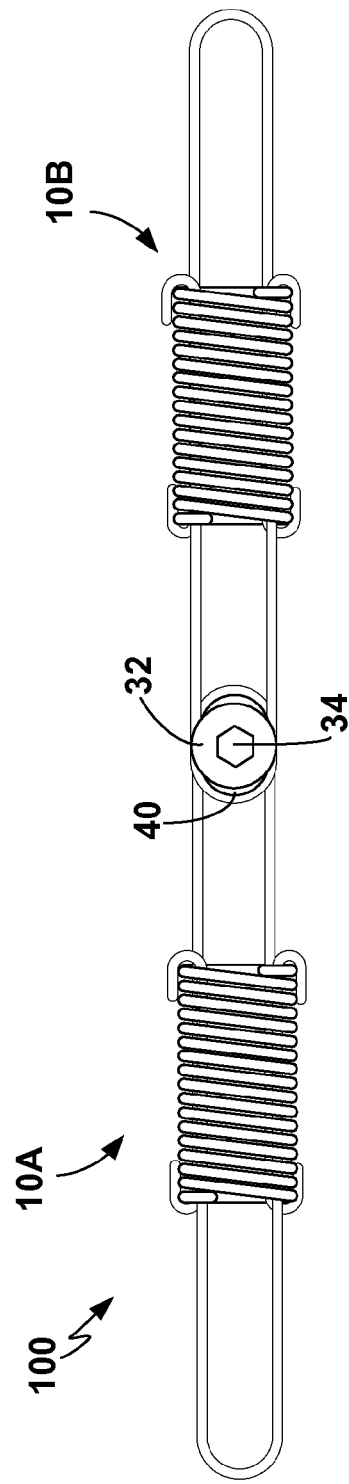

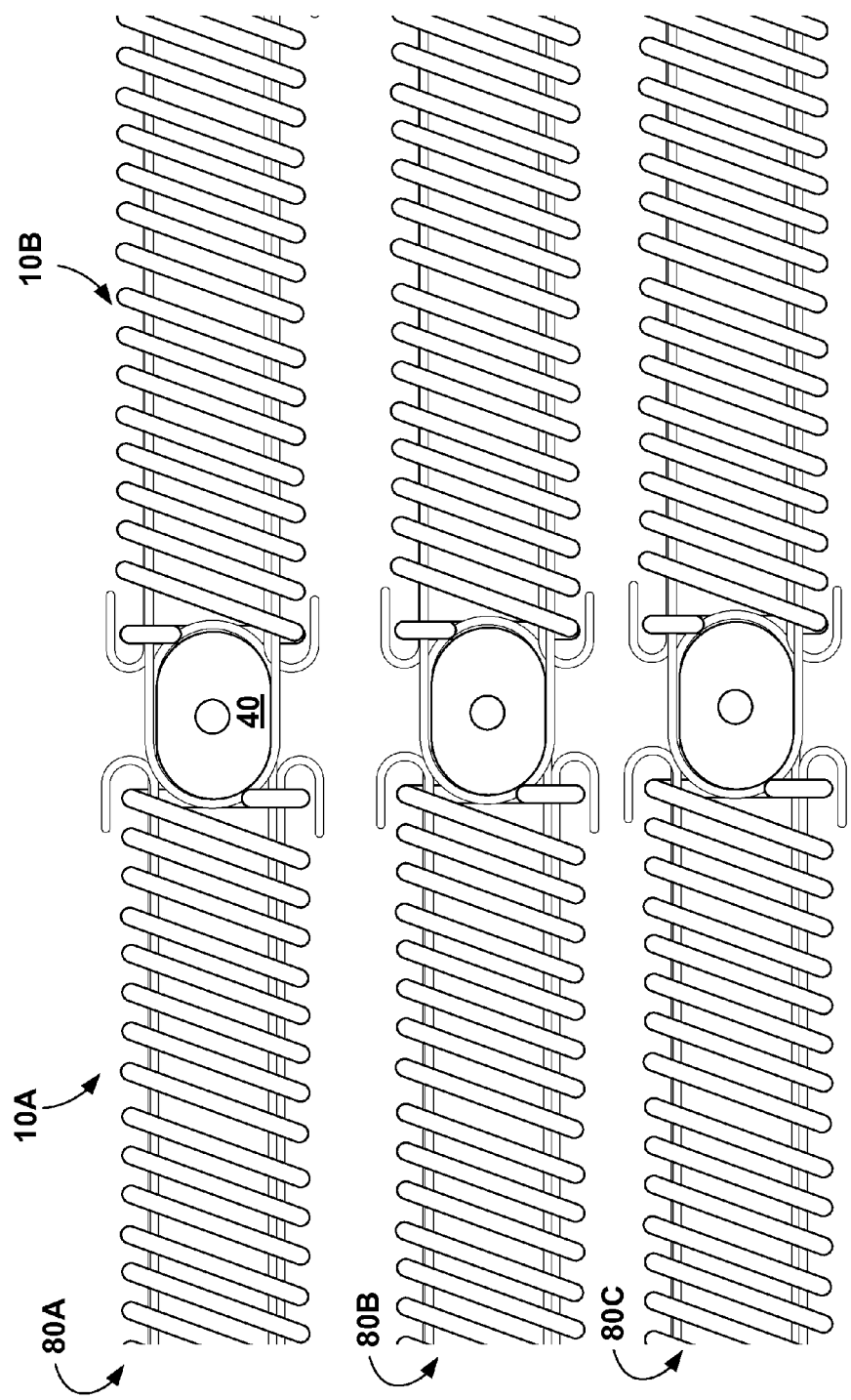

DRAWBAR SPRING COUPLER

TECHNICAL FIELD

The invention relates to drawbar springs.

BACKGROUND

A drawbar spring includes a spring coil and two compression elements that, when the spring is under a tension load, operate to compress the spring coil. In one common drawbar spring configuration, the compression elements of a drawbar are loop elements that originate on opposite ends of the coil and pass through the center of the spring coil. Each loop element passes through the entire length of the spring coil and hooks on the opposite end of the spring coil.

When a drawbar spring is under a tension load, the loop elements are under tension and the spring coil is compressed. The configuration of a drawbar spring offers a built-in definite stop such that the drawbar spring can continue to carry a static load after reaching its maximum extended length. The definite stop is determined by the point at which the spring coil is fully compressed. Drawbar springs can also carry a static load if the spring coil fractures. For this reason, drawbar springs can be suitable for use in potential overload situations.

Drawbar springs including loop elements are available in a variety of standard sizes.

SUMMARY

In general, this disclosure relates to techniques for coupling drawbar springs in series.

In one example, an assembly comprises a first drawbar spring, a second drawbar spring and a linkage coupling the first drawbar spring to the second drawbar spring. The first drawbar spring includes: a first spring coil, a first loop element that extends through the first spring coil and hooks on a first end of the first spring coil, and a second loop element that opposes the first loop element. The second loop element extends through the first spring coil and hooks on a second end of the first spring coil. The first and second loop elements are configured to compress the first spring coil when a tension load is applied to the first drawbar spring. The second drawbar spring includes: a second spring coil, a third loop element that extends through the second spring coil and hooks on a first end of the second spring coil, and a fourth loop element that opposes the third loop element. The fourth loop element extends through the second spring coil and hooks on a second end of the second spring coil. The third and fourth loop elements are configured to compress the second spring coil when the tension load is applied to the second drawbar spring. The linkage includes a first rounded end providing a complimentary profile with respect to an inner radius of the first loop element. The linkage includes a second rounded end providing a complimentary profile with respect to an inner radius of the fourth loop element. The linkage is positioned within the first loop element at the second end of the first drawbar spring such that the first rounded end is mated to the first loop element. The linkage is also positioned within the fourth loop element at the first end of the second drawbar spring such that the second rounded end is mated to the fourth loop element to mechanically couple the first loop element of the first drawbar spring to the fourth loop element of the second drawbar spring.

In another example, a linkage comprises a first rounded end providing a complimentary profile configured to mate with an inner radius of a loop element in a first drawbar spring, and a second rounded end opposite the first rounded end. The second rounded end provides a complimentary profile configured to mate with an inner radius of a loop element in a second drawbar spring. The linkage is configured to be positioned between the loop element in the first drawbar spring and the loop element in the second drawbar spring such that the first rounded end is mated with the loop element in the first drawbar spring and the second rounded end is mated with the loop element in the second drawbar spring to mechanically couple the first drawbar spring in series with the second drawbar spring.

In another example, a kit comprises a linkage, two washers, a bolt and a nut. The linkage comprises a first rounded end providing a complimentary profile configured to mate with an inner radius of a loop element in a first drawbar spring, a second rounded end opposite the first rounded end, the second rounded end providing a complimentary profile configured to mate with an inner radius of a loop element in a second drawbar spring, and two substantially planar surfaces that form corners with the first rounded and the second rounded end. The linkage forms an aperture that extends through the substantially planar surfaces. The linkage is configured to be positioned between the loop element in the first drawbar spring and the loop element in the second drawbar spring such that the first rounded end is mated with the loop element in the first drawbar spring and the second rounded end is mated with the loop element in the second drawbar spring to mechanically couple the first drawbar spring in series with the second drawbar spring. Each washer is configured to be positioned in alignment with the aperture of the linkage with one washer being on either side of the linkage. The bolt is configured to extend through both washers and the aperture of the linkage. The nut is configured to be threaded on the end of the bolt opposite a head of the bolt to secure the washers on either side of the linkage. The washers have outer diameters that are greater than twice the inner radii of the loop element in the first drawbar spring and the loop element in the second drawbar spring such that the washers are configured to prevent the loop element in the first drawbar spring and the loop element in the second drawbar spring from slipping off the linkage when the washers are secured on either side of the linkage and the linkage mechanically couples the first drawbar spring in series with the second drawbar spring.

The details of one or more examples are set forth in the accompanying drawings and the description below. Other features, objects, and advantages of this disclosure will be apparent from the description and drawings, and from the claims.

BRIEF DESCRIPTION OF DRAWINGS

FIGS. 1A-1B illustrate a drawbar spring with a spring coil and two loop elements.

FIGS. 4A-4D illustrate two drawbar springs mechanically coupled in series with a linkage.

FIGS. 7A-7B illustrate three sets of two drawbar springs mechanically coupled in series with a linkage, the three sets being mechanically coupled in parallel.

DETAILED DESCRIPTION

Figure 2:
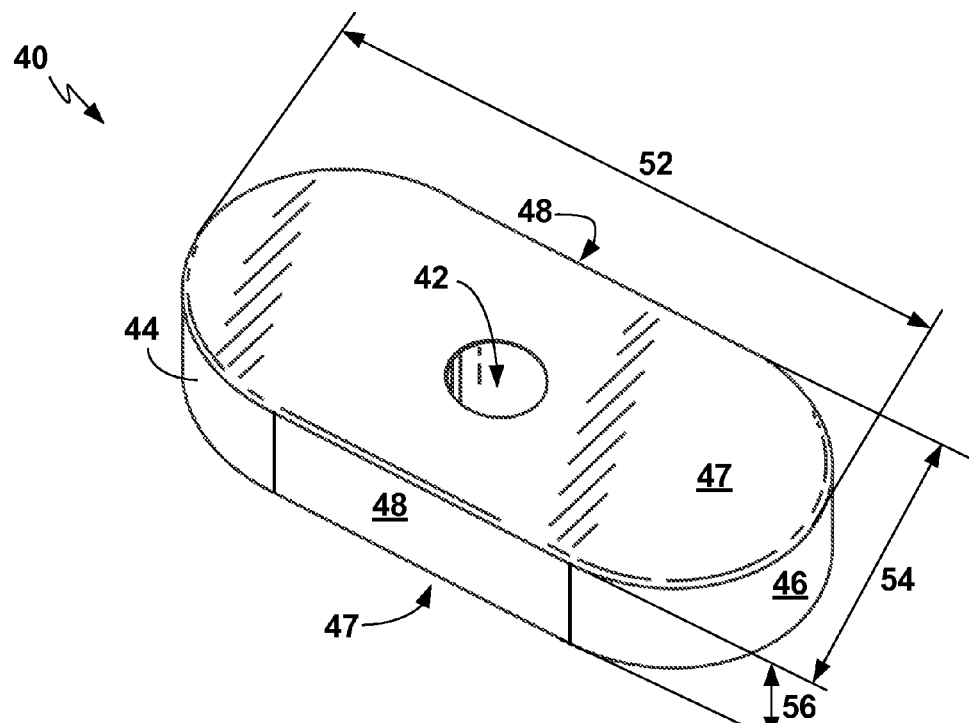
FIG. 2 illustrates an exemplary linkage configured to mechanically couple two drawbar springs in series.

FIGS. 1A-1B illustrate drawbar spring 10. As best shown in FIG. 1A, drawbar spring 10 include a single spring coil 16 and two loop elements 12A, 12B (collectively "loop elements 12"). Loop elements 12 each form an inner radius 14A, 14B (collectively "inner radii 14"), which creates an attachment point for the assembled drawbar spring 10. Loop elements 12 each also form hook elements 13A, 13B, which hook onto spring coil 16 on the opposite side relative to the corresponding inner radii 14.

In particular, during assembly of drawbar spring 10, loop element 12A is inserted in first end 17 of spring coil 16 until hook element 13A hooks on first end 17 of spring coil 16 and inner radius 14A protrudes from second end 18 of spring coil 16. Similarly, loop element 12B is inserted in second end 18 of spring coil 16 until hook element 13B hooks on second end 18 of spring coil 16 and inner radius 14B protrudes from first end 17 of spring coil 16. As shown in FIG. 1B, when drawbar spring 10 is fully assembled, loop element 12B opposes loop element 12A such that inner radius 14A extends from end 18 of spring coil 16 and inner radius 14B extends from end 17 of spring coil 16.

When drawbar spring 10 experiences a tensional load, loop elements 12 operate to compress spring coil 16 until spring coil 16 is fully compressed and drawbar spring 10 reaches its definite stop.

The ability to couple drawbar springs, such as drawbar spring 10, in series may be helpful to create custom spring lengths by combining two or more standard size drawbar springs. As provided herein, a linkage that includes rounded ends configured to mate with inner radii of loop elements of two drawbar springs may be used to mechanically couple two drawbar springs in series. Different size linkages may be used to create different custom spring lengths. Examples of such linkages include linkages 40, 60, as shown in FIGS. 2 and 3 respectively.

While it is possible to simply pass one loop element of a first drawbar spring through a loop element of a second drawbar spring to couple two drawbar springs in series, such a configuration offers no rigidity between the individual drawbar springs, as each behaves much like the link of a steel chain in that the drawbar springs are free to rotate relative to each other.

It is also possible to attach one loop element of a first drawbar spring to a loop element of a second drawbar spring by passing a bolt through both loop elements and securing the bolt with a nut. This has the effect of shortening the overall spring length by the diameter of the bolt, which might be an advantage when space is a consideration. It also has the effect of causing the pair of drawbar springs to be semi-rigid, as the bolt acts as a hinge. Thus, when connected with a bolt, the two drawbar springs can rotate in one plane with respect to each other. Such a configuration may require a relatively large bolt as the bolt head and nut must provide larger diameters than the width of the loop elements to prevent the loop elements from slipping off the both. For this reason, with the bolt size required for this configuration, the nut and bolt add considerable bulk to a pair of drawbar springs mechanically coupled in series with a nut and bolt.

Figure 3:
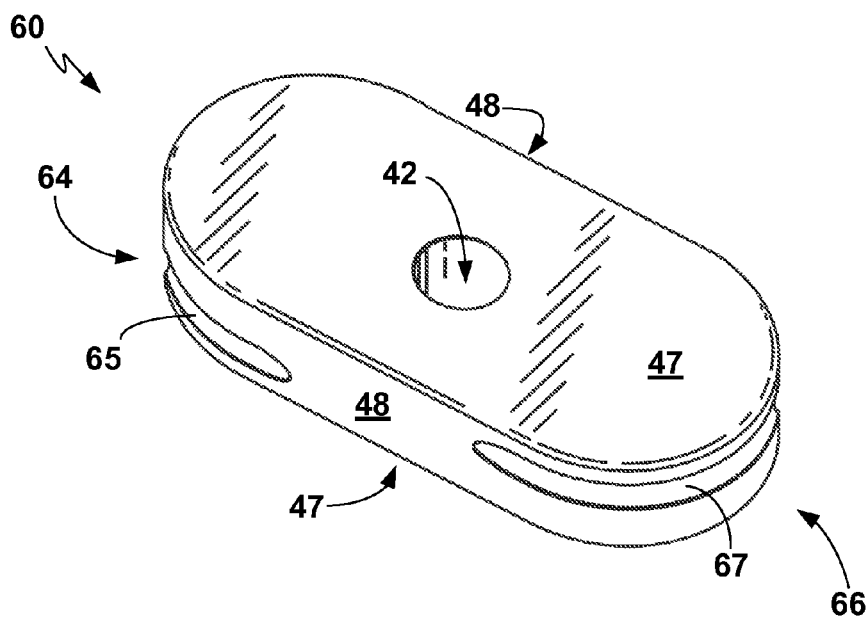
FIG. 3 illustrates an exemplary linkage configured to mechanically couple two drawbar springs in series.

In comparison, linkages 40, 60, as shown in FIGS. 2 and 3 respectively, may be used to rigidly couple loop elements of two drawbar springs in series. Linkages 40, 60 are configured to be inserted through one loop element of a first drawbar spring and also through a loop element of a second drawbar spring. Rather than being round like a bolt, however, Linkages 40, 60 are oblong, with rounded ends 44, 46, 64, 66 and parallel sides 48.

Rounded ends 44, 46 of linkage 40 provide complimentary profiles with respect to inner radii of loop elements of two drawbar springs to mate to the loop elements and mechanically couple the drawbar springs in series. For example, the radii of rounded ends 44, 46 can be configured to roughly match the inner radii of the loop elements of the drawbar springs, allowing the loop elements to seat against rounded ends 44, 46.

Rounded ends 44, 46 are connected by a pair of substantially parallel flat surfaces 48. In other examples, rounded ends 44, 46 may be configured to mate with different sized loop elements and rounded ends 44, 46 may have different radii relative to one another. In such an example, flat surfaces 48 would not be substantially parallel to one another. In further examples, rounded ends 44, 46 may be adjacent one another such that a linkage forms a round shape or rounded ends 44, 46 may be adjacent one another such that a linkage forms a profile with two arcs that meet at vertices. Linkage 40 further includes two substantially planar surfaces 47 that form perpendicular corners with rounded ends 44, 46 and substantially parallel flat surfaces 48.

As shown in FIG. 2, linkage 40 has a length 52, a width 54 and a thickness 56. Width 54 is configured to approximate twice the width of an inner radius of a loop element of a drawbar spring. Length 52 is measured between the tip of rounded end 44 and the tip of rounded end 46. Length 52 is greater than width 54 and width 54 is greater than thickness 56. Length 52 determines the overall length of a pair of drawbar springs coupled in series using linkage 40. In particular, the longer length 52, the shorter the overall length of the pair of drawbar springs coupled in series using linkage 40. In some instances, as shown and described with respect to FIG. 6, length 52 may be long enough that the spring coils in a pair of drawbar springs coupled in series using linkage 40 are preloaded.

Thickness 56 is at least twice the diameter of a wire forming a loop element of a drawbar spring. This allows two loop elements to fit on linkage 40 as the loop elements of drawbar springs mechanically coupled in series by linkage 40 may overlap on flat surfaces 48.

Linkage 40 forms aperture 42, which extends through substantially planar surfaces 47. Aperture 42 is configured to receive a bolt to secure linkage 40 to the loop elements of drawbar springs mechanically coupled by linkage 40 and prevent the loop elements from slipping off linkage 40.

Linkage 60 is substantially similar to linkage 40, except that rounded ends 64, 66 of linkage 60 are different than rounded ends 44, 46 of linkage 40. In particular, rounded end 64 includes groove 65 and rounded end 66 includes groove 67. Grooves 65, 67 are configured to receive a wire forming a loop element of a drawbar spring. In some examples, rounded ends 64, 66 and grooves 65, 67 may be substantially similar to one another. In other examples, rounded end 64 and groove 65 may be configured to mate with a drawbar spring of a different size than rounded end 66 and groove 67. In such an example, rounded end 64 may have a different width than rounded end 66 such that the widths of rounded ends 64, 66 correspond to the different size drawbar springs.

FIGS. 4A-4D illustrate components of assembly 100, which includes drawbar springs 10A, 10B mechanically coupled in series with linkage 40. In other examples, drawbar springs 10A, 10B may be mechanically coupled in series with linkage 60 (FIG. 3). Assembly 100 further includes fender washers 32, bolt 34 and nut 36, which secure linkage 40 to the loop elements of drawbar springs 10A, 10B and prevent the loop elements from slipping off linkage 40. FIG. 4A illustrates an exploded view of assembly 100. FIG. 4B illustrates assembly 100 prior to the installation of fender washers 32, bolt 34 and nut 36. FIG. 4C illustrates assembly 100 in a relaxed position, and FIG. 4D illustrates assembly 100 while experiencing tension load.

In assembly 100, drawbar springs 10A, 10B are mechanically coupled in series with linkage 40 such that linkage 40 is positioned within a loop element of drawbar spring 10A such that rounded end 44 (FIG. 2) is mated to the loop element of drawbar spring 10A, and linkage 40 is positioned within a loop element of drawbar spring 10B such that rounded end 46 (FIG. 2) is mated to the loop element of drawbar spring 10B to mechanically couple the loop element of drawbar spring 10A to the loop element of drawbar spring 10B.

Fender washers 32 are in alignment with aperture 42 (FIG. 2) of linkage 40, with one of fender washers 32 being on either side of linkage 40. Bolt 34 extends through both fender washers 32 and through aperture 42 of linkage 40. Nut 36 is threaded on the end of bolt 34 opposite the head of bolt 34 to secure fender washers 32 on either side of linkage 40. Fender washers 32 have outer diameters that are greater than twice inner radii 14 (FIG. 1B) of the loop elements of drawbar springs 10A, 10B to prevent the loop elements from slipping off linkage 40. In examples in which linkage 40 is replaced by linkage 60, grooves 65, 67 (FIG. 3) may be sufficient to prevent the loop elements from slipping off linkage 60. In particular, if the length of linkage 60 is great enough to preload the spring coils of drawbar springs 10A, 10B grooves 65, 67 may be sufficient to prevent the loop elements from slipping off linkage 60.

In one example, a kit may include linkage 40 (or linkage 60), fender washers 32, bolt 34 and nut 36. Such a kit may be used to mechanically couple two standard size drawbar springs, such as drawbar springs 10A, 10B, in series. More than two drawbar springs may also be coupled in series using the same techniques used to couple drawbar springs 10A, 10B in series.

Figure 5:
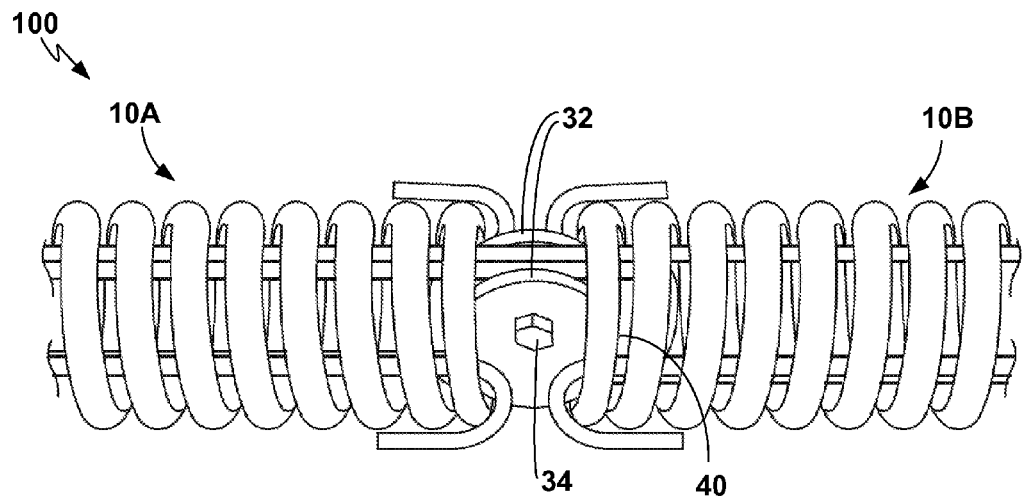
FIG. 5 illustrates two drawbar springs mechanically coupled in series with a linkage that does not preload the spring coils of the drawbar springs.

FIG. 5 provides a close-up perspective view of assembly 100. As illustrated by FIG. 5, length 52 of linkage 40 is not a great enough to preload the spring coils of drawbar springs 10A, 10B in assembly 100.

Figure 6:
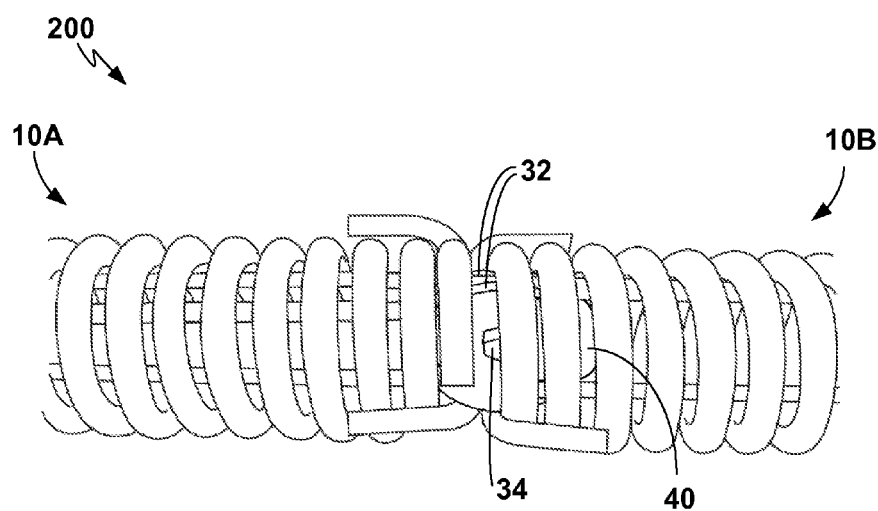
FIG. 6 illustrates two drawbar springs mechanically coupled in series with a comparatively longer linkage that preloads the spring coils of the drawbar springs.

In contrast, FIG. 6 provides a close-up perspective view of assembly 200. In assembly 200, length 52 of linkage 40 is great enough to preload the spring coils of drawbar springs 10A, 10B. In particular, length 52 of linkage 40 is long enough so that the spring coil of drawbar spring 10A interferes with the spring coil of drawbar spring 10B such that both spring coils are preloaded. Assuming assemblies 100 and 200 are substantially similar except for length 52 of linkage 40, the increased length 52 of linkage 40 in assembly 200 shortens the overall length of assembly 200 as well as the travel length of assembly 200. In addition, the increased length 52 of linkage 40 in assembly 200 increases the initial spring force required to extend assembly 200 relative to assembly 100 as the spring coils in assembly 200 are preloaded. In this manner, length 52 of linkage 40 can be configured to provide a desired initial spring force, a desired length of travel and/or a desired overall length of an assembly with linkage 40 mechanically coupling two drawbar springs.

Figure 7B:
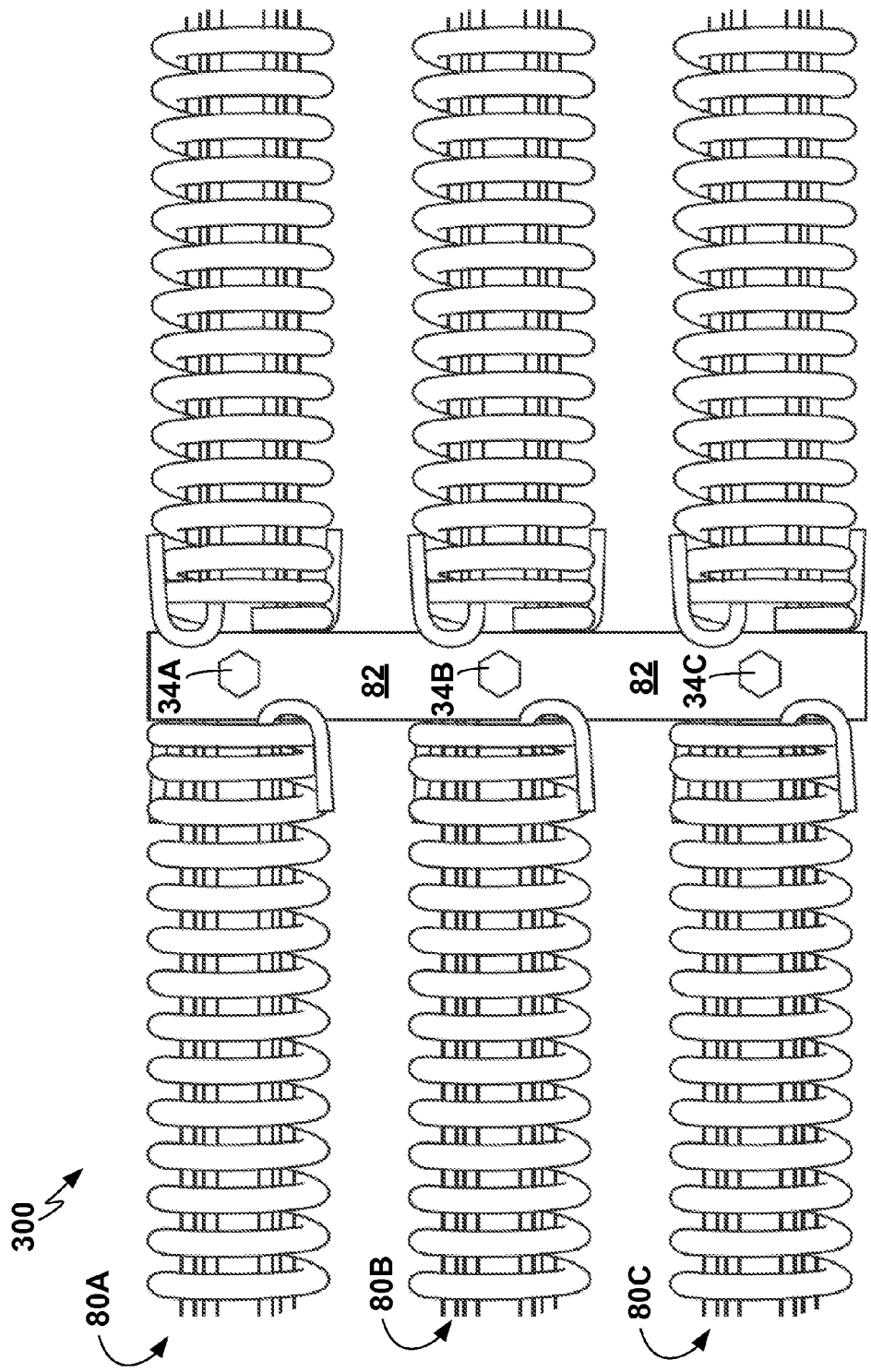

FIGS. 7A-7B illustrate components of assembly 300, which includes three sets of two drawbar springs 80A, 80B, 80C (collectively "sets 80") mechanically coupled in series with linkage 40 and bar 82, the three sets 80 being mechanically coupled in parallel with each other. Bar 82 is a flat piece of metal including apertures that align with the apertures of linkages 40 (or linkages 60). Bolts 34A, 34B, 34C extend through the apertures of linkages 40 and through the apertures of bar 82. Bolts 34A, 34B, 34C combine with bar 82 to mechanically couple the three sets of two drawbar springs 80 in parallel with each other. In this manner, linkages 40 (or linkages 60) can be used in combination with a bar including apertures, such as bar 82, to facilitate coupling multiple sets of two drawbar springs in parallel. In addition, multiple bars 82 can also be used to couple sets with series of three or more drawbar springs in parallel.

In one example, assembly 300 may include washers on bolts 34A, 34B, 34C opposite bar 82 to hold the loop elements of drawbar spring sets 80 on linkages 40. In another example, assembly 300 may include a second bar opposite bar 82 to hold the loop elements of drawbar spring sets 80 on linkages 40. In either example, the loop elements of drawbar spring sets 80 are constrained so as to not slip from linkages 40.

Various embodiments of the invention have been described. These and other embodiments are within the scope of the following claims.

The invention claimed is:

1. An assembly comprising:
    a first drawbar spring, wherein the first drawbar spring includes:
    a first spring coil;
    a first loop element that extends through the first spring coil and hooks on a first end of the first spring coil; and
    a second loop element that opposes the first loop element, wherein the second loop element extends through the first spring coil and hooks on a second end of the first spring coil,
    wherein the first and second loop elements are configured to compress the first spring coil when a tension load is applied to the first drawbar spring;
    a second drawbar spring, wherein the second drawbar spring includes:
    a second spring coil;
    a third loop element that extends through the second spring coil and hooks on a first end of the second spring coil; and
    a fourth loop element that opposes the third loop element, wherein the fourth loop element extends through the second spring coil and hooks on a second end of the second spring coil,
    wherein the third and fourth loop elements are configured to compress the second spring coil when the tension load is applied to the second drawbar spring; and a linkage coupling the first drawbar spring to the second drawbar spring,
    wherein the linkage includes a first rounded end providing a complimentary profile with respect to an inner radius of the first loop element,
    wherein the linkage includes a second rounded end providing a complimentary profile with respect to an inner radius of the fourth loop element,
    wherein the linkage is positioned within the first loop element at the second end of the first drawbar spring such that the first rounded end is mated to the first loop element, and the linkage is also positioned within the fourth loop element at the first end of the second drawbar spring such that the second rounded end is mated to the fourth loop element to mechanically couple the first loop element of the first drawbar spring to the fourth loop element of the second drawbar spring such that the first loop element overlaps with the fourth loop element.

2. An assembly comprising:
a first drawbar spring, wherein the first drawbar spring includes:
a first spring coil;
a first loop element that extends through the first spring coil and hooks on a first end of the first spring coil; and
a second loop element that opposes the first loop element, wherein the second loop element extends through the first spring coil and hooks on a second end of the first spring coil,
wherein the first and second loop elements are configured to compress the first spring coil when a tension load is applied to the first drawbar spring;
a second drawbar spring, wherein the second drawbar spring includes:
a second spring coil;
a third loop element that extends through the second spring coil and hooks on a first end of the second spring coil; and
a fourth loop element that opposes the third loop element, wherein the fourth loop element extends through the second spring coil and hooks on a second end of the second spring coil,
wherein the third and fourth loop elements are configured to compress the second spring coil when the tension load is applied to the second drawbar spring; and
a linkage coupling the first drawbar spring to the second drawbar spring,
wherein the linkage includes a first rounded end providing a complimentary profile with respect to an inner radius of the first loop element,
wherein the linkage includes a second rounded end providing a complimentary profile with respect to an inner radius of the fourth loop element,
wherein the linkage is positioned within the first loop element at the second end of the first drawbar spring such that the first rounded end is mated to the first loop element, and
the linkage is also positioned within the fourth loop element at the first end of the second drawbar spring such that the second rounded end is mated to the fourth loop element to mechanically couple the first loop element of the first drawbar spring to the fourth loop element of the second drawbar spring such that the first loop element overlaps with the fourth loop element,
wherein a length of the linkage as measured between the first rounded end and the second rounded end is greater than a diameter of the complimentary profile of the first rounded end.

3. An assembly comprising:
a first drawbar spring, wherein the first drawbar spring includes:
a first spring coil;
a first loop element that extends through the first spring coil and hooks on a first end of the first spring coil; and
a second loop element that opposes the first loop element, wherein the second loop element extends through the first spring coil and hooks on a second end of the first spring coil,
wherein the first and second loop elements are configured to compress the first spring coil when a tension load is applied to the first drawbar spring;
a second drawbar spring, wherein the second drawbar spring includes:
a second spring coil;
a third loop element that extends through the second spring coil and hooks on a first end of the second spring coil; and
a fourth loop element that opposes the third loop element, wherein the fourth loop element extends through the second spring coil and hooks on a second end of the second spring coil,
wherein the third and fourth loop elements are configured to compress the second spring coil when the tension load is applied to the second drawbar spring; and
a linkage coupling the first drawbar spring to the second drawbar spring,
wherein the linkage includes a first rounded end providing a complimentary profile with respect to an inner radius of the first loop element,
wherein the linkage includes a second rounded end providing a complimentary profile with respect to an inner radius of the fourth loop element,
wherein the linkage is positioned within the first loop element at the second end of the first drawbar spring such that the first rounded end is mated to the first loop element, and
the linkage is also positioned within the fourth loop element at the first end of the second drawbar spring such that the second rounded end is mated to the fourth loop element to mechanically couple the first loop element of the first drawbar spring to the fourth loop element of the second drawbar spring,
wherein a length of the linkage as measured between the first rounded end and the second rounded end is greater than a width of the complimentary profile of the first rounded end,
wherein the length of the linkage is long enough that the linkage preloads the first spring coil and the second spring coil.

4. The assembly of claim 1,
wherein a thickness of the linkage is less than a diameter of the complimentary profile of the first rounded end and less than the length of the linkage,
wherein the thickness of the linkage is at least twice the diameter of a wire forming the first loop element.

5. The assembly of claim 1,
wherein the first rounded end includes a first groove configured to receive a first wire forming the first loop element,
wherein the second rounded end includes a second groove configured to receive a second wire forming the fourth loop element.

6. The assembly of claim 1, wherein the linkage includes two substantially planar surfaces that form corners with the first rounded and the second rounded end.

7. The assembly of claim 1, wherein the linkage forms an aperture, the assembly further comprising:
a bolt extending through the aperture; and
a nut threaded on the bolt on an opposite side of the aperture relative to a bolt head of the bolt.

8. The assembly of claim 1, wherein the linkage forms an aperture, the assembly further comprising:
two washers, each washer being in alignment with the aperture of the linkage and one washer being on either side of the linkage;
a bolt extending through both washers and the aperture of the linkage; and
a nut threaded on the end of the bolt opposite a head of the bolt to secure the washers on either side of the linkage,
wherein the washers have outer diameters that are greater than twice the inner radius of the first loop element and the second loop element to prevent the first loop element and the second loop element from slipping off the linkage.

9. The assembly of claim 1, wherein the linkage is a first linkage forming a first aperture, wherein the first drawbar spring and the second drawbar spring are a first pair of drawbar springs, the assembly further comprising:
a second pair of drawbar springs in parallel with the first pair of drawbar springs;
a second linkage mechanically coupling the drawbar springs in the second pair of drawbar springs in series, wherein the second linkage forms a second aperture; and
a bar including bar apertures in alignment with the first aperture and the second aperture;
a first bolt extending through the first aperture and through the bar aperture in alignment with the first aperture; and
a second bolt extending through the second aperture and through the bar aperture in alignment with the second aperture,
wherein the first and second bolts combine with the bar to mechanically couple the first pair of drawbar springs in parallel with the second pair of drawbar springs.

10. The assembly of claim 9, further comprising:
a third pair of drawbar springs in parallel with the first and second pairs of drawbar springs;
a third linkage mechanically coupling the drawbar springs in the third pair of drawbar springs in series, wherein the third linkage forms a third aperture; and
a third bolt extending though the third aperture and through a bar aperture in alignment with the third aperture;
wherein the third bolt combines with the bar to mechanically couple the third pair of drawbar springs in parallel with the first and second pairs of drawbar springs.

11. A linkage comprising:
a first rounded end providing a complimentary profile configured to mate with an inner radius of a loop element in a first drawbar spring;
a second rounded end opposite the first rounded end, the second rounded end providing a complimentary profile configured to mate with an inner radius of a loop element in a second drawbar spring;
wherein the linkage is configured to be positioned between the loop element in the first drawbar spring and the loop element in the second drawbar spring such that the first rounded end is mated with the loop element in the first drawbar spring and the second rounded end is mated with the loop element in the second drawbar spring to mechanically couple the first drawbar spring in series with the second drawbar spring,
wherein a length of the linkage as measured between the first rounded end and the second rounded end is greater than a width of the complimentary profile of the first rounded end; and
two fenders, the fenders being configured to be fastened on either side of the linkage,
wherein the fenders have outer dimensions that are greater than twice the inner radii of the loop element in the first drawbar spring and the loop element in the second drawbar spring such that the fenders are configured to prevent the loop element in the first drawbar spring and the loop element in the second drawbar spring from slipping off the linkage when the fenders are fastened on either side of the linkage and the linkage mechanically couples the first drawbar spring in series with the second drawbar spring.

12. The linkage of claim 11, wherein the length of the linkage as measured between the first rounded end and the second rounded end is greater than a diameter of the complimentary profile of the first rounded end.

13. The linkage of claim 11, wherein the length of the linkage is long enough that the linkage is configured to preload a spring coil in the first drawbar spring and a spring coil in the second drawbar spring when the linkage mechanically couples the first drawbar spring in series with the second drawbar spring.

14. The linkage of claim 11,
wherein a thickness of the linkage is less than the diameter of the complimentary profile and less than the length of the linkage, wherein the thickness of the linkage is at least twice the diameter of a wire forming the loop element of the first drawbar spring.

15. The linkage of claim 11,
wherein the first rounded end includes a first groove configured to receive a first wire forming the loop element of the first drawbar spring,
wherein the second rounded end includes a second groove configured to receive a second wire forming the loop element of the second drawbar spring.

16. The linkage of claim 11, wherein the linkage includes two substantially planar surfaces that form corners with the first rounded and the second rounded end.

17. The linkage of claim 16,
wherein linkage includes parallel sides between the first and second rounded ends,
wherein the two substantially planar surfaces form corners with the parallel sides.

18. The linkage of claim 11, wherein the linkage forms an aperture that extends through the substantially planar surfaces, wherein the aperture is configured to receive a bolt to secure the linkage, including the fenders, to the loop element in the first drawbar spring and the loop element in the second drawbar spring and prevent the loop element in the first drawbar spring and the loop element in the second drawbar spring from slipping off the linkage.

19. A kit comprising:
a linkage comprising:
a first rounded end providing a complimentary profile configured to mate with an inner radius of a loop element in a first drawbar spring;
a second rounded end opposite the first rounded end, the second rounded end providing a complimentary profile configured to mate with an inner radius of a loop element in a second drawbar spring; and
two substantially planar surfaces that form corners with the first rounded and the second rounded end,
wherein the linkage forms an aperture that extends through the substantially planar surfaces,
wherein the linkage is configured to be positioned between the loop element in the first drawbar spring and the loop element in the second drawbar spring such that the first rounded end is mated with the loop element in the first drawbar spring and the second rounded end is mated with the loop element in the second drawbar spring to mechanically couple the first drawbar spring in series with the second drawbar spring,
wherein a length of the linkage as measured between the first rounded end and the second rounded end is greater than a diameter of the complimentary profile of the first rounded end;
two washers, each washer being configured to be positioned in alignment with the aperture of the linkage with one washer being on either side of the linkage;

a bolt configured to extend through both washers and the aperture of the linkage; and a nut configured to be threaded on the end of the bolt opposite a head of the bolt to secure the washers on either side of the linkage, wherein the washers have outer diameters that are greater than twice the inner radii of the loop element in the first drawbar spring and the loop element in the second drawbar spring such that the washers are configured to prevent the loop element in the first drawbar spring and the loop element in the second drawbar spring from slipping off the linkage when the washers are secured on either side of the linkage and the linkage mechanically couples the first drawbar spring in series with the second drawbar spring.

20. The kit of claim 19, wherein the length of the linkage is long enough that the linkage is configured to preload a spring coil in the first drawbar spring and a spring coil in the second drawbar spring when the linkage mechanically couples the first drawbar spring in series with the second drawbar spring.

\* \* \* \* \*